United States Patent [19]
Baer et al.

[11] Patent Number: 5,948,033
[45] Date of Patent: Sep. 7, 1999

[54] ELECTRONIC CONTROLLER FOR IDENTIFYING AND OPERATING AN AUTOMATED MANUAL TRANSMISSION

[75] Inventors: Kurt R. Baer, Toledo, Ohio; Liu Ning, Ypsilanti, Mich.; James A. Wheeler, Perrysburg, Ohio

[73] Assignee: Transmission Technologies Corporation, Farmington Hills, Mich.

[21] Appl. No.: 08/607,968

[22] Filed: Feb. 29, 1996

[51] Int. Cl.$^6$ .................................................. G01M 19/00
[52] U.S. Cl. ............................................ 701/51; 73/118.1
[58] Field of Search .................................. 73/866.5, 116, 73/117.2, 117.3, 118.1; 701/51

[56] References Cited

U.S. PATENT DOCUMENTS

| | | | |
|---|---|---|---|
| 4,752,883 | 6/1988 | Asakura et al. | 73/117.3 |
| 4,841,815 | 6/1989 | Takahashi | 701/51 |
| 5,027,647 | 7/1991 | Shimanaka | 73/117.3 |
| 5,067,374 | 11/1991 | Sakai et al. | 701/51 |
| 5,079,705 | 1/1992 | Sakai et al. | 701/51 |
| 5,099,428 | 3/1992 | Takahashi | 701/51 |
| 5,107,431 | 4/1992 | Ohta et al. | 701/113 |
| 5,124,916 | 6/1992 | Tokoro et al. | 701/113 |
| 5,186,155 | 2/1993 | Miyashita et al. | 701/113 |
| 5,235,875 | 8/1993 | Yoshida et al. | 701/51 |
| 5,341,295 | 8/1994 | Nakagawa et al. | 701/113 |
| 5,363,027 | 11/1994 | Noguchi | 73/118.1 |
| 5,477,452 | 12/1995 | Milunas et al. | 73/117.3 |

*Primary Examiner*—George Dombroske
*Attorney, Agent, or Firm*—MacMillan, Sobanski & Todd, LLC

[57] ABSTRACT

An electronic controller for use in a partially or fully automatic vehicle transmission. The transmission includes an automatic shifting mechanism for partially or fully automating the shifting thereof to select and engage gear ratios. The automatic shifting decisions are made by an electronic control circuit including an electronic controller which receives electrical signals representative of the rotational speeds of the input and output shafts of the transmission. An algorithm is performed by the electronic controller to identify the structure of the underlying transmission and adopt an appropriate shifting strategy based upon the rotational speeds of the input and output shafts of the transmission. Initially, the electronic controller determines if the transmission is, in fact, engaged in a gear ratio. Once it has been determined that the transmission is engaged in a gear ratio, the electronic controller determines what the specific magnitude of that gear ratio is. Next, the electronic controller identifies a particular structure for the transmission based upon a plurality of sensed gear ratios. The electronic controller may employ principles of fuzzy logic to assist in identifying the underlying transmission structure. Lastly, the electronic controller adopts a shifting strategy which is appropriate for the identified transmission structure for use in performing subsequent automatic shifting functions.

20 Claims, 5 Drawing Sheets

|   | 10th | 9th | 8th | 7th | 6th |
|---|---|---|---|---|---|
| A | 1:0.75 | 1:1.00 | 1:1.39 | 1:1.92 | 1:2.61 |
| B | 1:0.75 | 1:1.00 | 1:1.33 | 1:1.85 | 1:2.50 |
| C | 1:1.00 | 1:1.33 | 1:1.77 | 1:2.45 | 1:3.39 |
| D | — | 1:0.74 | 1:1.00 | 1:1.37 | 1:1.89 |
| E | — | 1:1.00 | 1:1.34 | 1:1.83 | 1:2.55 |

FIG. 3

|   | OVER DRIVE | DIRECT DRIVE | UNDER DRIVE | UNDER DRIVE | UNDER DRIVE |
|---|---|---|---|---|---|
| A | 1:0.75 | 1:1.00 | 1:1.39 | 1:1.92 | 1:2.61 |
| B | 1:0.75 | 1:1.00 | 1:1.33 | 1:1.85 | 1:2.50 |
| C | — | 1:1.00 | 1:1.33 | 1:1.77 | 1:2.45 |
| D | 1:0.74 | 1:1.00 | 1:1.37 | 1:1.89 | 1:2.65 |
| E | — | 1:1.00 | 1:1.34 | 1:1.83 | 1:2.55 |

FIG. 4

ELECTRONIC CONTROLLER FOR IDENTIFYING AND OPERATING AN AUTOMATED MANUAL TRANSMISSION

BACKGROUND OF THE INVENTION

This invention relates in general to vehicle transmissions and in particular to an improved structure for facilitating the use of an electronic controller with a number of different mechanical transmission structures to provide a partially or fully automated manual transmission.

In most vehicles, a transmission is provided in the drive train between the engine and the driven wheels. As is well known, the transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

The shifting of the transmission among the available gear ratios is frequently accomplished manually, wherein the selection and engagement of a specific gear ratio is performed in response to some physical exertion by the vehicle driver. Most commonly, the driver grasps and physically moves an upper portion of an elongated shift lever. In response thereto, a lower portion of the shift lever engages and moves one of a plurality of shift rails provided within the transmission. Movement of the selected shift rail causes certain ones of the meshing gears to be connected between the input shaft and the output shaft so as to provide the desired gear ratio therebetween. Manually shifted transmissions are desirable because they are relatively simple, inexpensive, and lightweight in structure and operation. Because of this, the majority of medium and heavy duty truck transmissions in common use today are manually shifted transmissions.

In order to improve the convenience of use of manually shifted transmissions, various structures have been proposed for partially or fully automating the shifting thereof. In a partially automated manual transmission, the driver-manipulated shift lever engages and moves certain ones of the shift rails, while an automatic shifting mechanism (which may be hydraulically or pneumatically actuated) engages and moves the remaining shift rails. For example, the lower gear ratios of a partially automated manual transmission may be manually selected and engaged by the vehicle driver using the shift lever, while the higher gear ratios are automatically selected and engaged by the automatic shifting mechanism. In a fully automated manual transmission, the driver-operated shift lever is usually replaced by the automatic shifting mechanism. The automatic shifting mechanism functions to shift all of the shift rails within the transmission throughout all of the available gear ratios. A partially automated manual transmission is advantageous, particularly in long haul and similar trucking applications, because it is lower in cost than a comparable fully automated manual transmission, yet offers automatic shifting in the higher gear ratios where the majority of shifting between gears normally occurs.

In all types of transmissions, decisions must be made as to when to shift the transmission out of a current gear ratio and into a new gear ratio. For a given transmission structure, these shifting decisions (referred to in the aggregate as the shifting strategy for the transmission) are typically based upon a number of operating conditions for the vehicle and the transmission, such as engine speed, vehicle speed, current gear ratio, throttle position, and the like. In manually shifted transmissions, the shifting decisions are made by the driver of the vehicle based upon experience. In both partially and fully automated transmissions, however, the shifting decisions are made by an electronic controller. To accomplish this, the electronic controller includes a plurality of sensors which generate electrical signals which are representative of a number of the predetermined operating conditions of the vehicle. These electrical signals are fed to the electronic controller which, in turn, is programmed to shift the transmission out of a current gear ratio and into a new gear ratio when certain predetermined operating conditions have been sensed.

In order to properly decide when a shift should occur in response to these sensed operating conditions, the electronic controller should be programmed with information regarding the specific structure of the transmission with which it is being used. Primarily, this information includes the quantity of gear ratios which are contained within the transmission and the specific magnitudes of such gear ratios. This basic transmission structure information, together with the sensed operating conditions discussed above, will determine the most efficient shifting strategy for that particular transmission structure. As is well known, transmissions vary widely in structure in order to accommodate vehicles of differing size, weight, and intended use. For example, the quantity of gear ratios which are contained within the transmission may vary from as low as three or four gear ratios (such as for a small automobile) to as high as sixteen or eighteen gear ratios (such as for a large truck). Additionally, the magnitudes of the specific gear ratios which are available for use will vary, even among transmissions having the same quantity of gear ratios. For example, the magnitude of the highest gear ratio available in some ten-speed transmissions is a 1:1.00 direct drive gear ratio, wherein the rotational speed of the output shaft of the transmission is equal to the rotational speed of the input shaft. The magnitude of the highest gear ratio available in other ten-speed transmissions is a 1:0.75 over drive gear ratio, wherein the rotational speed of the output shaft of the transmission is greater than the rotational speed of the input shaft. Obviously, therefore, differing transmission structures will have differing shifting strategies for optimum operation.

Ideally, each electronic controller would be programmed with the specific information which relates to the particular transmission structure with which it is intended to be used. In this instance, the electronic controller would be programmed within only a single shifting strategy which relates to that particular transmission structure. As a practical matter, however, such an arrangement would be rather inefficient, inasmuch as it would require that each electronic controller be individually programmed with a specific shifting strategy when it is manufactured and assembled with a particular underlying transmission structure. One possible simplification of this procedure would be to initially store a plurality of shifting strategies (relating to a plurality of different transmission structures) in all of the electronic controllers, and then to manually identify to the electronic controller which particular transmission strategy is to be used. Based upon this manual input, the electronic controller would select the desired one of the plurality of shifting strategies for use. Unfortunately, this procedure still somewhat inefficient, inasmuch as it requires an individual to manually identify the transmission structure which is being used and to properly program the electronic controller to identify that transmission structure. Also, if the electronic controller is subsequently removed from a first transmission structure and installed on a second different transmission structure, it requires re-programming of the electronic controller for proper operation with new information. Thus, it would be desirable to provide an improved structure for an electronic controller which can automatically identify the structure of the transmission which with it is being used and program itself to use pre-programmed information regarding that transmission structure to efficiently effect automatic shifting of the transmission in response to sensed operating conditions.

SUMMARY OF THE INVENTION

This invention relates to an improved structure for an electronic controller for use in a partially or fully automatic vehicle transmission. The transmission includes an automatic shifting mechanism for partially or fully automating the shifting thereof to select and engage gear ratios. The automatic shifting decisions are made by an electronic control circuit including an electronic controller which receives electrical signals representative of the rotational speeds of the input and output shafts of the transmission. An algorithm is performed by the electronic controller to identify the structure of the underlying transmission and adopt an appropriate shifting strategy based upon the rotational speeds of the input and output shafts of the transmission. Initially, the electronic controller determines if the transmission is, in fact, engaged in a gear ratio. Once it has been determined that the transmission is engaged in a gear ratio, the electronic controller determines what the specific magnitude of that gear ratio is. Next, the electronic controller identifies a particular structure for the transmission based upon a plurality of sensed gear ratios. The electronic controller may employ principles of fuzzy logic to assist in identifying the underlying transmission structure. Lastly, the electronic controller adopts a shifting strategy which is appropriate for the identified transmission structure for use in performing subsequent automatic shifting functions.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a chart which comparatively illustrates the structures of five different transmissions, wherein the magnitudes of the gear ratios are arranged vertically by gear shift position.

FIG. 4 is a chart containing the same transmission structure information as presented in FIG. 3, wherein the magnitudes of the gear ratios are arranged vertically by the nature of the gear ratio.

DETAILED DESCRIPTION OF THE PREFERRED EMBODIMENT

Figure 1:
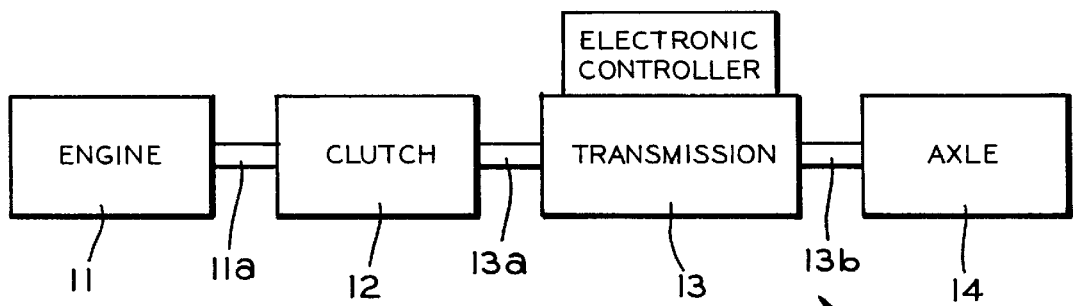
FIG. 1 is a block diagram of a vehicle drive train assembly including a transmission and electronic controller in accordance with this invention.

Referring now to the drawings, there is illustrated in FIG. 1 a block diagram of a vehicle drive train assembly, indicated generally at 10. The drive train assembly 10 includes a conventional engine 11 or other source of rotational power. The engine 11 is connected through an output shaft 11a, such as a crankshaft of the engine 11, to a clutch 12. The clutch 12 is also conventional in the art and functions to selectively connect the output shaft 11a of the engine 11 to an input shaft 13a of a transmission 13. The transmission 13 contains a plurality of meshing gears (not shown) which are selectively connected between the input shaft 13a and an output shaft 13b. The meshing gears contained within the transmission 13 are of varying size so as to provide a plurality of such gear ratios. By appropriately shifting among these various gear ratios, a desired speed reduction gear ratio can be provided between the input shaft 13a and the output shaft 13b. Consequently, acceleration and deceleration of the vehicle can be accomplished in a smooth and efficient manner. The output shaft 13b is connected to a conventional axle assembly 14. The axle assembly 14 includes one or more wheels which are rotatably driven by the engine 11 whenever the clutch 12 and the transmission 13 are engaged. This general structure for the drive train assembly 10 is well known in the art.

The illustrated transmission 13 may be either a partially or fully automated mechanical transmission. In a typical partially automated manual transmission, a driver-manipulated shift lever (not shown) engages and moves certain ones of a plurality of shift rails contained within the transmission to engage a first set of gear ratios for use. However, an automatic shifting mechanism (which may be hydraulically or pneumatically actuated) engages and moves the remaining shift rails to engage a second set of gear ratios for use. For example, it is known to provide a partially automated manual transmission wherein the lower gear ratios are manually selected and engaged by the vehicle driver using the shift lever, while the higher gear ratios are automatically selected and engaged by the automatic shifting mechanism. One example of a typical partially automated manual transmission of this general structure is disclosed in detail in U.S. Pat. No. 5,450,767, owned by the assigned of this application. The disclosure of that patent is incorporated herein by reference. In a fully automated manual transmission, the driver-operated shift lever is usually replaced by the automatic shifting mechanism. The automatic shifting mechanism functions to shift all of the shift rails contained within the transmission so as to select and engage all of the available gear ratios. The above-referenced patent discusses the adaptability of the disclosed partially automated shifting mechanism to fully automate the shifting of the transmission disclosed therein.

Figure 2:
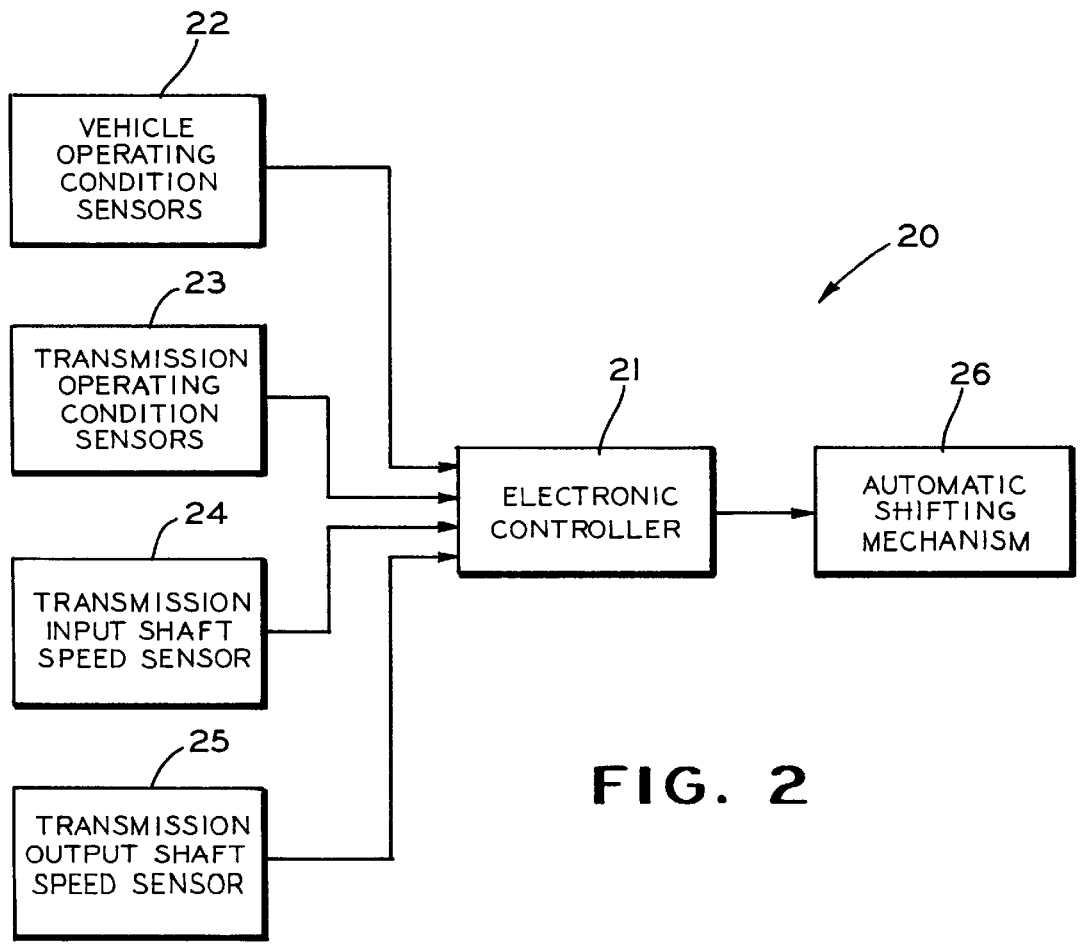
FIG. 2 is a block diagram of an electronic control circuit for use with the transmission illustrated in FIG. 1.

When the drive train assembly 10 is operated, decisions must be made as to when to shift the transmission 13 out of a current gear ratio and into a new gear ratio. These shifting decisions are typically based upon a number of operating conditions for both the vehicle and the transmission. These operating conditions can include such parameters as vehicle speed and acceleration, engine speed and acceleration, current gear ratio, and the like. For the purpose of illustration only, it will be assumed that the disclosed transmission 13 is a partially automated manual transmission having lower gear ratios which are manually shifted by the vehicle driver and higher gear ratios which are automatically shifted by the automatic shifting mechanism. For such a partially automated manual transmission 13, the manual shifting decisions for the lower gear ratios are made manually by the driver of the vehicle based upon experience. The automatic shifting decisions for the higher gear ratios, however, are made by an electronic control circuit, which is indicated generally at 20 in FIG. 2.

The electronic control circuit 20 includes an electronic controller 21, which may be embodied as a conventional microprocessor or similar computing apparatus which can be programmed to generate one or more electrical output signals in response to a plurality of electrical input signals. In the illustrated embodiment, one or more vehicle operating condition sensors 22 are connected to the electronic controller 21. The vehicle operating condition sensors 22 are conventional in the art and are adapted to generate electrical signals which are representative of a number of the desired operating conditions of the vehicle. For example, the sensors 22 may generate electrical signals which are representative of engine speed, vehicle speed, current gear ratio, throttle position, and the like. In the illustrated embodiment, the electronic control circuit 20 further includes one or more transmission operating condition sensors 23 which are also connected to the electronic controller 21. The transmission operating condition sensors 23 are conventional in the art and are adapted to generate electrical signals which are representative of a number of the desired operating conditions of the transmission 13. For example, the sensors 23 may generate electrical signals which are representative of shift rail position, shift lever position, and the like, as discussed in the above-referenced patent.

The electronic control circuit 20 of this invention further includes a transmission input shaft speed sensor 24 and a transmission output shaft speed sensor 25. The transmission input shaft speed sensor 24 generates electrical signals which are representative of the rotational speed of the input shaft 13a of the transmission 13. Similarly, the transmission output shaft speed sensor 25 generates electrical signals which are representative of the rotational speed of the output shaft 13b of the transmission 13. The specific purpose for these sensors 24 and 25 will be explained in detail below. Generally, however, when the transmission 13 is operated in the automatic shifting mode, the electronic controller 21 is responsive to the electrical signals generated by the various sensors 22, 23, 24, and 25 generate output signals to an automatic shifting mechanism 26. The automatic shifting mechanism 26 may, as described in the above-referenced patent, include a plurality of solenoid actuated valves which are selectively opened and closed to cause shifting of the transmission 13 out of a current gear ratio and into a new gear ratio. As discussed above, the electronic controller 21 is programmed to effect such shifting when certain predetermined operating conditions of the vehicle and the transmission 13 have been sensed.

As mentioned above, transmissions vary widely in structure in order to accommodate vehicles of differing size, weight, and intended use. FIG. 3 is a chart which comparatively illustrates the structures of five different transmissions, identified as transmissions A through E, which might be used in conjunction with the electronic controller 21 in the vehicle drive train system 10 discussed above. The quantities of gear ratios and the specific magnitudes of such gear ratios shown in FIG. 3 are for illustration purposes only, inasmuch as this invention can be used with virtually any transmission structure which is partially or fully automated. Furthermore, for the purpose of simplification, the FIG. 3 chart shows only the upper gear ratios of each of the transmissions A through E. It will be appreciated that this chart may be expanded to include the lower gear ratios if desired.

As shown in FIG. 3, three of the illustrated transmissions (transmissions A, B, and C) contain a total of ten gear ratios, while the remaining two of the illustrated transmissions (transmissions D and E) contain a total of nine gear ratios. As further shown in the chart, the magnitudes of the specific gear ratios which are available for use varies among each of the transmissions A through E. Thus, even though transmissions A, B, and C all contain a total of ten gear ratios, the magnitudes of the specific gear ratios contained in transmissions A, B, and C differ, particularly in the lower gear ratios. Similarly, transmissions D and E both contain a total of nine gear ratios, and the magnitudes of the specific gear ratios contained in transmissions D and E differ.

More specifically, transmission A is a ten-speed over drive transmission wherein the 6th gear ratio is 1:2.61, the 7th gear ratio is 1:1.92, the 8th gear ratio is 1:1.39, the 9th gear ratio is 1:1.00 (direct drive), and the 10th gear ratio is 1:0.75 (over drive). Transmission B is a ten-speed over drive transmission wherein the 6th gear ratio is 1:2.50, the 7th gear ratio is 1:1.85, the 8th gear ratio is 1:1.33, the 9th gear ratio is 1:1.00 (direct drive), and the 10th gear ratio is 1:0.75 (over drive). Transmission C is a ten-speed direct drive transmission wherein the 6th gear ratio is 1:3.39, the 7th gear ratio is 1:2.45, the 8th gear ratio is 1:1.77, the 9th gear ratio is 1:1.33, and the 10th gear ratio is 1:1.00 (direct drive). Transmission D is a nine-speed over drive transmission wherein the 6th gear ratio is 1:1.89, the 7th gear ratio is 1:1.37, the 8th gear ratio is 1:1.00 (direct drive), and the 9th gear ratio is 1:0.74 (over drive). Lastly, transmission E is a nine-speed direct drive transmission wherein the 6th gear ratio is 1:2.55, the 7th gear ratio is 1:1.83, the 8th gear ratio is 1:1.34, and the 9th gear ratio is 1:1.00 (direct drive).

FIG. 4 is a chart which contains the same information as FIG. 3, but which has been re-arranged for the purpose of facilitating the explanation of this invention. In FIG. 3, the magnitudes of the gear ratios for transmissions A through E are arranged vertically by gear shift position (i.e., 6th gear, 7th gear, 8th gear, etc.). In FIG. 4, the same information is presented, but the magnitudes of the gear ratios are arranged vertically by the nature of the gear ratio (i.e., over drive, direct drive, under drive, etc.). Thus, it can be seen that the three over drive transmissions (transmissions A, B, and D) have over drive gear ratios which are virtually identical, and further that all of the transmissions A through E have direct drive ratios which are identical. It can also be seen that some of the lower gear ratios are similar or identical among the various transmissions A through E. For example, the highest under drive gear ratio of transmissions B, C, and E are virtually identical. Lastly, it will be appreciated that the magnitudes of the gear ratios tend to diverge among the lower under drive gear ratios of the transmissions A through E. As will be explained in greater detail below, this divergence of the specific magnitudes of the gear ratios is what is used by the electronic controller 21 of this invention to distinguish among the structures of the various transmissions A through E.

As discussed above, the electronic controller 21 could be individually programmed with a shifting strategy which relates directly to the particular structure of the transmission 13. With that information stored within the electronic controller 21, the shifting decisions could be made by simply monitoring the signals generated by the vehicle operating condition sensors 22 and the transmission operating condition sensors 23 and comparing them to the stored shifting strategy. However, this invention relates to a means by which the electronic controller 21 can, by monitoring certain aspects of operation of the transmission 13, identify the structure thereof (i.e., the quantity of gear ratios contained therein and the specific magnitudes of such gear ratios) and automatically adopt a shifting strategy which is appropriate for that particular transmission structure. To accomplish this, the electronic controller 21 of this invention is programmed with an algorithm which measures the lower gear ratios of the transmission 13 as the transmission 13 is shifted therethrough (either manually or automatically), identifies a particular transmission structure based upon the measured gear ratios, and automatically adopts a single one of a plurality of stored shifting strategy for use in performing subsequent automatic shifting operations.

Figure 5:
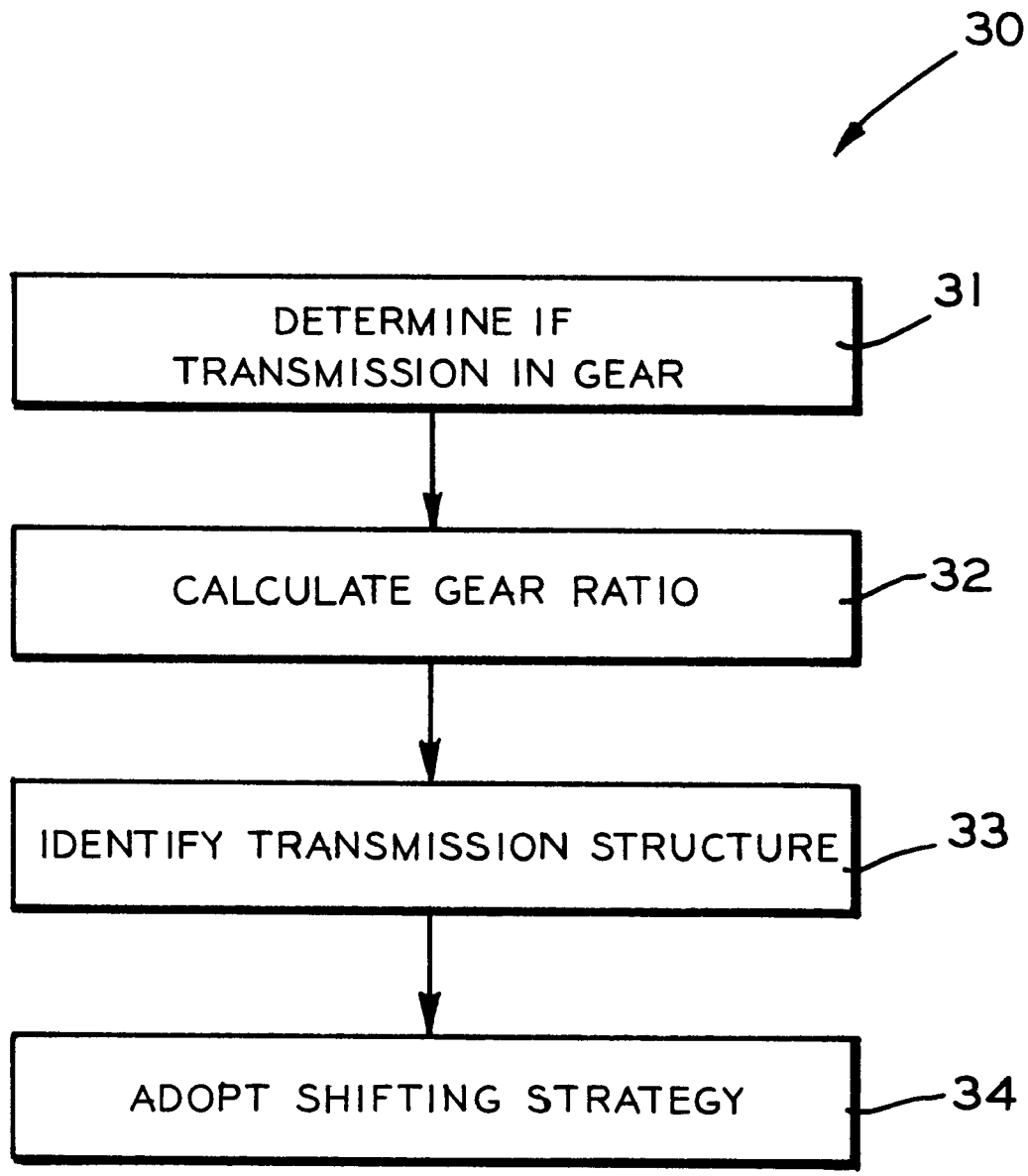
FIG. 5 is a simplified flow chart illustrating the transmission determining algorithm performed by the electronic controller illustrated in FIGS. 1 and 2.

FIG. 5 is a simplified flowchart, indicated generally at 30, which recites the basic steps 31, 32, 33, and 34 of the algorithm performed by the electronic controller 21. The details regarding the performance of each of these steps will be discussed below. In the first step 31 of the algorithm, the electronic controller 21 must determine if the transmission 13 is, in fact, engaged in a gear ratio. If the transmission 13 is not engaged in any gear ratio, such as being in neutral, further analysis would be valueless. Once it has been determined that the transmission 13 is engaged in a gear ratio, the second step 32 of the algorithm calls for the electronic controller 21 to determine what the specific magnitude of that gear ratio is. The third step 33 of the algorithm is for the electronic controller 21 to identify a particular structure for the transmission 13 based upon the sensed gear ratio (or a plurality of sensed gear ratios, as will be explained below). Lastly, the final step 34 of the algorithm is to adopt a shifting strategy which is appropriate for the identified transmission 13. As mentioned above, the electronic controller 21 is pre-programmed with a plurality of shifting strategies and, in response to the identification of the transmission 13, selects one of those shifting strategies to control subsequent automatic shifting. However, the adopted shifting strategy may be provided by other means, such as by computation algorithms and the like.

As discussed above, in the first step 31 of the algorithm, the electronic controller 21 must determine if the transmission 13 is, in fact, engaged in a gear ratio. This first step 31 can be performed in several ways. One method would be to provide a gear engagement sensor (not shown) within the transmission 13. This gear engagement sensor, part of the transmission operating condition sensors 22 discussed above, would generate an electrical signal whenever one of the shift rails of the transmission 13 was moved out of the neutral position. While relatively simple to implement from the standpoint of the algorithm, such a structure would require the use of additional mechanical components within the transmission 13, resulting in additional hardware expense and complexity. Thus, it would be desirable to provide an alternative method for determining if the transmission 13 is engaged in a gear ratio.

Figure 6:
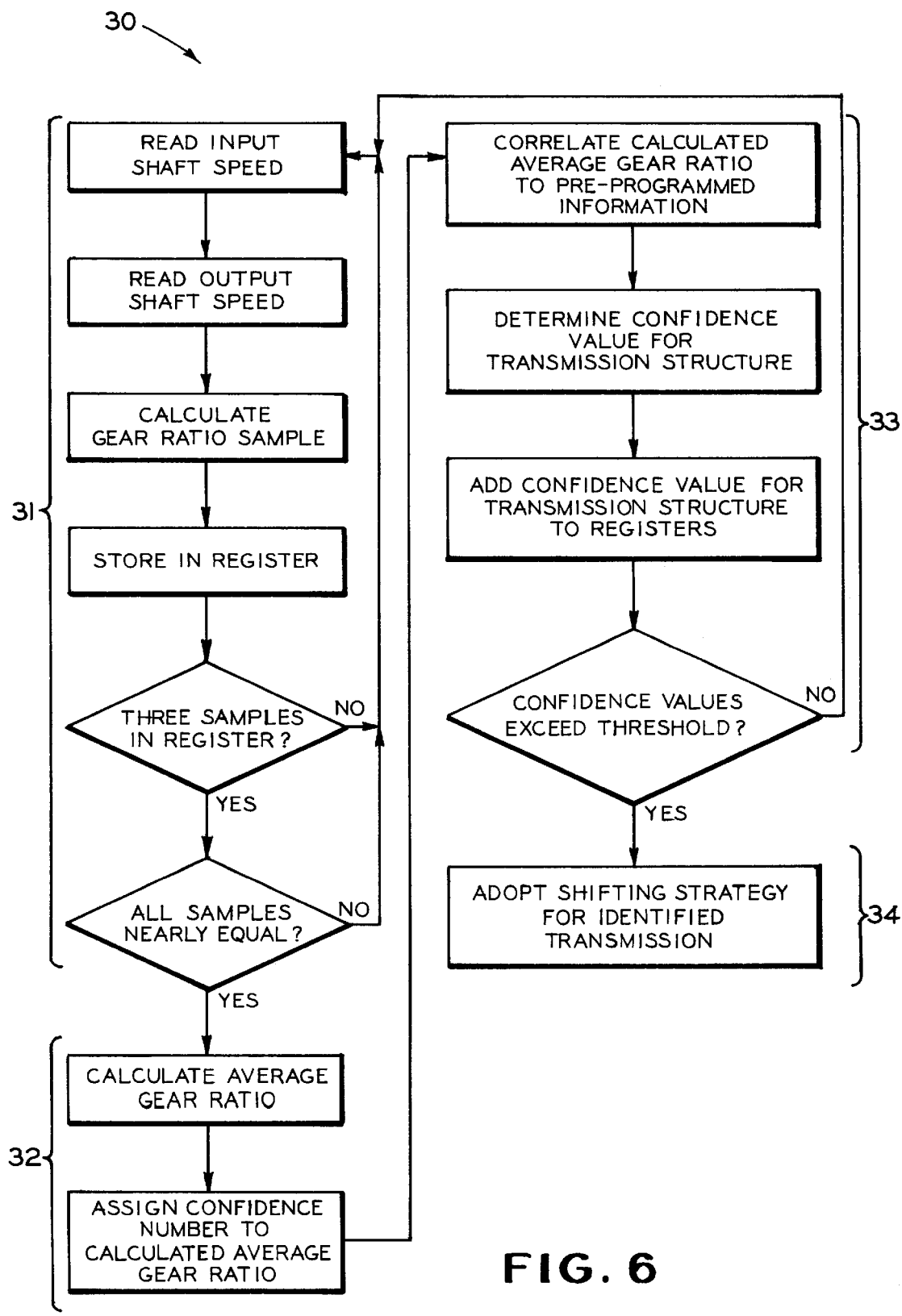
FIG. 6 is a more detailed flow chart illustrating the transmission determining algorithm performed by the electronic controller illustrated in FIGS. 1 and 2.

FIG. 6 is a flowchart illustrating the steps which can be performed by the electronic controller to determine if the transmission 13 is engaged in a gear ratio. Initially, the signals from the transmission input shaft speed sensor 24 and the transmission output shaft speed sensor 25 are read by the electronic controller 21. Then, the output shaft speed is divided by the input shaft speed to provide a calculated gear ratio sample. Preferably, this calculated gear ratio sample is multiplied by a factor of one hundred to eliminate the use of a decimal point in further calculations. The calculated gear ratio sample is then stored in a first in, first out register of predetermined size. It has been found to be acceptable to provide a register which is capable of storing a total of three of such calculated gear ratio samples. The electronic controller 21 next determines whether a sufficient number of gear ratio samples has been taken to permit further analysis. In the illustrated embodiment, it is assumed that three of such calculated gear ratio samples are necessary for further analysis. Thus, it the register is not filled, the program branches back to the first step to obtain, calculate, and store additional gear ratio samples.

In theory, all of the calculated gear ratio samples would be identical and exactly equal to the precise gear ratio engaged by the transmission 13. In reality, however, because of noise, transients, and other real-world inconsistencies, the calculated gear ratio samples will vary somewhat. Thus, once the register is filled with three different calculated gear ratio samples, the electronic controller 21 determines whether the three samples are sufficiently close to one another so as to be likely to represent a valid gear ratio. Any known method can be used to determine whether the three samples are sufficiently close to one another so as to be likely to represent a valid gear ratio. For instance, the electronic controller 21 may use the following relationship to determine the quality of the three calculated gear ratio samples:

$$[\min(X_1, X_2)] \div [\max(X_1, X_2) - \min(X_1, X_2)] > \text{threshold value}$$

wherein $\min(X_1, X_2)$ represents the smaller of two calculated gear ratio samples, $\max(X_1, X_2)$ represents the larger of the same two calculated gear ratio samples, and the threshold value represents a predetermined measure of closeness for the two calculated gear ratio samples. In order to determine whether the three samples are sufficiently close to one another so as to be likely to represent a valid gear ratio, all of the different permutations of the three samples are tested by this relationship. If all of the different permutations satisfy the relationship, then it is assumed that the three samples are sufficiently close to one another so as to be likely to represent a valid gear ratio.

For example, assume that the three calculated gear ratio samples contained in the register are 193 (first sample, representing a gear ratio sample of 1:1.93), 191 (second sample, representing a gear ratio sample of 1:1.91), and 190 (third sample, representing a gear ratio sample of 1:1.90), and further that the threshold value equals 50. The first permutation of the three calculated gear samples would be as follows:

$$[\min(193,191)] \div [\max(193,191) - \min(193,191)] > 50$$

$$[191] \div [193 - 191] > 50$$

$$[191] \div [2] > 50$$

$$95.5 > 50$$

Thus, the first permutation of the three calculated gear samples satisfies the relationship. The second permutation of the three calculated gear samples would be as follows:

$$[\min(193,190)] \div [\max(193,190) - \min(193,190)] > 50$$

$$[190] \div [193 - 190] > 50$$

$$[190] \div [3] > 50$$

$$63.3 > 50$$

Thus, the second permutation of the three calculated gear samples satisfies the relationship. The third permutation of the three calculated gear samples would be as follows:

[min(191,190)]÷[max(191,190)−min(191,190)]>50

[190]÷[191−190]>50

[190]÷[2]>determined 50

95.0>50

Thus, the third permutation of the three calculated gear samples satisfies the relationship. In view of this, the electronic controller 21 assumes that the three samples are sufficiently close to one another so as to be likely to represent a valid gear ratio. If any one of these relationships is not satisfied, the program branches back to the first step to obtain, calculate, and store additional gear ratio samples.

Assuming that the three samples are sufficiently close to one another so as to be likely to represent a valid gear ratio, the electronic controller 21 next calculates the mathematical average thereof. This is accomplished simply by adding the three numbers together and dividing by three. Using the three samples recited above, the calculated average gear ratio would be 191.3, which can be truncated to simply 191 for convenience. Then, a confidence value is assigned to this calculated average gear ratio. The confidence value is a numerical representation of the probability of the accuracy of the calculated average gear ratio relative to the actual gear ratio of the transmission. Confidence values and confidence levels are employed in a form of knowledge representation known as fuzzy logic. Fuzzy logic principles are used in mathematics and computing to represent notions which cannot be defined precisely, but rather depend upon the context of the particular situation.

In this invention, the precise gear ratio of the transmission 13 cannot be readily determined. Thus, the calculated average gear ratio is first determined as discussed above, then an analysis is made to estimate how likely it is that such calculated average gear ratio is accurate. To accomplish this, the calculated average gear ratio (191 in the above example) is compared with the most recent calculated gear ratio sample (190 in the above example). Because these two numbers are quite close to one another, it is assumed that the probability is high that the calculated average gear ratio is close to the actual gear ratio of the transmission 13. Thus, a relatively high confidence value would be assigned to the calculated average gear ratio. If the two numbers were not so quite close to one another, it would be assumed that the probability is somewhat lower that the calculated average gear ratio is close to the actual gear ratio of the transmission 13, and a relatively low confidence value would be assigned thereto. It may be desirable to require that the confidence value associated with the calculated gear ratio exceed a predetermined minimum value, such as 50%, before proceeding with further analysis.

Assuming that the confidence value of the calculated average gear ratio meets this minimum value, the algorithm proceeds with the third step 33 in the above-discussed flowchart 30, namely, to identify the specific structure of the transmission 13 based upon the calculated average gear ratio. As discussed above, the calculated average gear ratio would theoretically be exactly equal to the precise gear ratio engaged by the transmission 13. If this were true, the electronic controller 21 could simply search the chart illustrated in FIG. 3 for a gear ratio which matches the calculated average gear ratio. Once found, the identity of the structure of the transmission 13 could be determined, and the shifting strategy therefor could be adopted. However, because the uncertainty involved with the calculated average gear ratio, and further because some of the gear ratios contained in the FIG. 3 chart are found in more than one transmission structure, this simple procedure is usually not adequate to clearly identify a specific transmission structure.

Accordingly, the algorithm of this invention employs the additional steps illustrated in the FIG. 6 flowchart to identify the specific structure of the transmission 13 based upon the calculated average gear ratio thus far achieved. The first step in identifying the structure of the transmission 13 is to relate the calculated average gear ratio (with its associated confidence value) to the pre-programmed information contained within the electronic controller 21 in order to determine whether the calculated gear ratio is indicative of a particular transmission structure. This can be represented graphically by the table illustrated in FIG. 7. As shown therein, the FIG. 7 graph is a fuzzy logic table having transmission gear ratios plotted along the horizontal axis and the confidence values plotted along the vertical axis. With reference to FIG. 4, it can be seen that the lowermost under drive gear ratios for the five transmissions A through E illustrated in the FIG. 4 chart are plotted on the bottom portion of the graph in FIG. 7. Each of these actual gear ratios has been assigned its own confidence value, ranging from 25% for the gear ratios relating to the transmissions B, C, and E to 15% for the gear ratios relating to the transmissions A and D. These confidence values are relatively high, reflecting the relatively high correlation between a given one of the actual gear ratios and the particular transmission associated therewith. In other words, if the calculated average gear ratio is exactly equal to 2.45, then it is relatively likely that the transmission 13 has the structure of transmission C in the FIG. 4 chart. Similarly, if the calculated average gear ratio is not exactly equal to 2.45, then it is less likely that the transmission 13 has the structure of transmission C in the FIG. 4 chart.

For example, assume that the calculated average gear ratio is 2.46 and has a confidence value of 80%. By reference to the FIG. 7 graph, it can be seen that the 2.46 gear ratio has a confidence value of 20% relative to the structure of transmission C. By multiplying these two confidence values together, the calculated average gear ratio of 2.46 results in a 16% (80%×20%) certainty that the structure of the transmission 13 in the drive train assembly 10 correlates with the structure of transmission C illustrated in FIG. 4. This 16% figure is stored in any convenient form within a register which is associated with transmission C by the electronic controller 21. It will be appreciated that a given calculated average gear ratio may simultaneously result in a somewhat smaller certainty that the structure of the transmission 13 in the drive train assembly 10 correlates with the structure of one of the other transmissions A, B, D, or E illustrated in FIG. 4, as suggested by the dotted lines in the FIG. 7 graph. For example, the 2.46 gear ratio also has a confidence value of 5% relative to the structure of transmission B. By multiplying these two confidence values together, the calculated average gear ratio of 2.46 results in a 4% (80%×5%) certainty that the structure of the transmission 13 in the drive train assembly 10 correlates with the structure of transmission B illustrated in FIG. 4. This 4% figure is stored in a register which is associated with transmission B by the electronic controller 21.

The next step in the process is to determine if a sufficient number of calculated average gear ratios have been made to reliably identify the transmission 13. This can be done by establishing a threshold value for each of the registers relating to the transmissions A through E. For example, the threshold value may be set at 100% for each of the registers. If none of the registers contain this value, the program branches back to the beginning and repeats the entire process, beginning with reading the rotational speeds of the transmission input and output shafts and calculating a new gear ratio sample and ending with adding new confidence values to the appropriate registers of the electronic controller. After a period of time, a sufficient number of cycles through this algorithm will result in one of the registers exceeding the threshold value, allowing the electronic controller 21 to identify the structure of the transmission 13 with good certainty and to adopt an appropriate shifting strategy.

Figure 7:
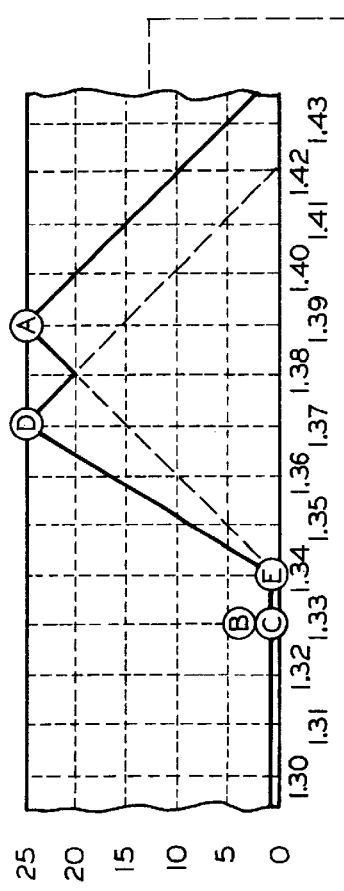
FIG. 7 is a fuzzy logic table having transmission gear ratios plotted along the horizontal axis and the confidence values plotted along the vertical axis which may be used by the electronic controller illustrated in FIGS. 1 and 2.
Figure 7:
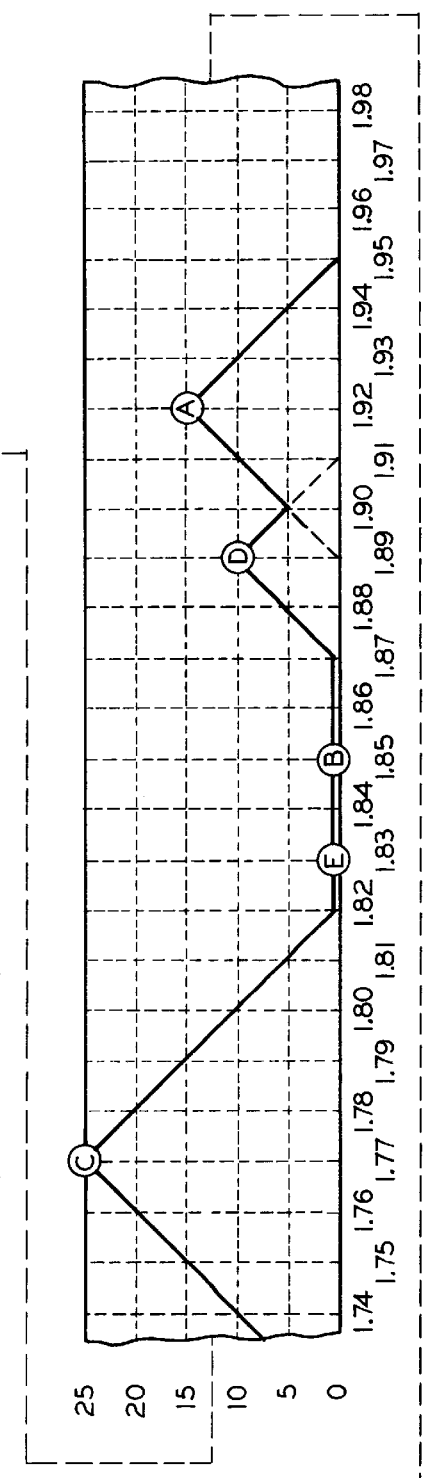
Figure 7:
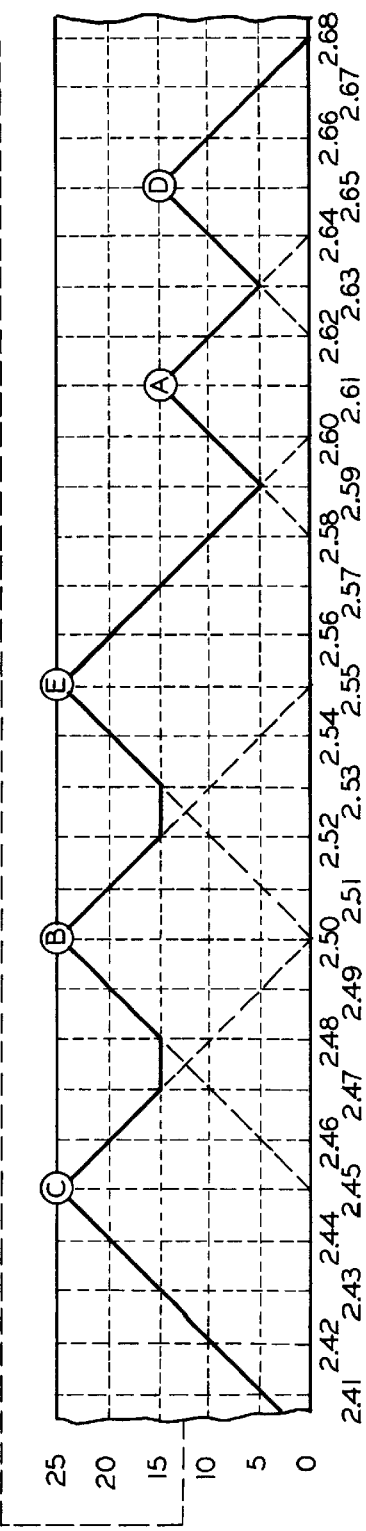

The middle and upper portions of the FIG. 7 graph show other portions of the fuzzy logic table for the higher under drive gear ratios for the transmissions A through E. As shown therein, the confidence values are somewhat lower in certain instances, such as the 1.83 and 1.85 gear ratios in the middle portion and the 1.33 and 1.34 gear ratios in the upper portion. These lower confidence values reflect the relatively low correlation between those actual gear ratios and the particular transmission associated therewith. In other words, if the calculated average gear ratio is equal to 1.33, then no useful information can be gathered as to the identity of the transmission 13 in the drive train assembly 10 because both transmission B and transmission C contain exactly that gear ratio, as shown in the FIG. 4 chart. Thus, in this instance, none of the registers of the electronic controller 21 would be increased. The direct drive and over drive gear ratios have been omitted from the FIG. 7 graph for this same reason.

Thus, it can be seen that the algorithm of this invention is effective to identify a specific one of a plurality of pre-programmed transmission structures and to adopt a shifting strategy which is appropriate for that particular transmission structure. This can be accomplished with only the use of the rotational speed sensors 24 and 25 provided on the transmission input and output shafts. If a gear position sensor were included as part of the transmission operating condition sensors 23, the algorithm could be greatly simplified. This is because the additional information provided by the gear position sensor (i.e., which gear ratio is currently engaged by the transmission 13) would eliminate some of the problems presented by the overlapping gear ratios of the different transmissions.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronic controller for operating a partially or fully automatically shifted vehicle transmission in accordance with a shifting strategy comprising:

means for determining a gear ratio for the transmission;

means responsive to the determined gear ratio for identifying a particular structure for the transmission; and means responsive to the identified transmission structure for adopting a shifting strategy for use by the electronic controller which is appropriate for the identified transmission structure.

2. The electronic controller defined in claim 1 wherein said means responsive to the identified transmission structure identifies the structure of the transmission using fuzzy logic principles to distinguish a particular transmission structure from a plurality of transmission structures.

3. The electronic controller defined in claim 1 further including a plurality of shifting strategies each associated with a different transmission structure and wherein said third means selects one shifting strategy from said plurality of shifting strategies based on the identified transmission structure.

4. The electronic controller defined in claim 3 further including storage means and wherein said plurality of shifting strategies are pre-programmed into said storage means.

5. The electronic controller defined in claim 1 wherein said first means for determining a gear ratio is comprised of sensing means for determining a gear ratio value of an engaged gear and calculating means for determining an average gear ratio based on a plurality of sensed gear ratio values.

6. The electronic controller defined in claim 5 wherein said sensing means is comprised of a transmission input shaft speed sensor for generating an electrical signal representative of the transmission input shaft speed, a transmission output shaft speed sensor for generating an electrical signal representative of the transmission output shaft speed, and means for dividing said transmission output shaft speed signal by said transmission input shaft speed signal so as to calculate a gear ratio value.

7. The electronic controller defined in claim 5 wherein said sensing means is comprised of a gear engagement sensor for generating an electrical signal representative of a gear ratio value.

8. The electronic controller defined in claim 5 wherein said calculating means is comprised of means for storing at least three values of said sensed gear ratio, means for calculating a mathematical average of said three stored gear ratio values, and means for assigning a first confidence value to said calculated average gear ratio value.

9. The electronic controller defined in claim 8 wherein said first confidence value is a numerical representation of a probability of an accuracy of said calculated average gear ratio value relative to an actual gear ratio value of the transmission.

10. The electronic controller defined in claim 8 wherein said first confidence value must exceed a predetermined minimum value before said second means is responsive to the determined gear ratio.

11. The electronic controller defined in claim 8 wherein said calculating means is further comprised of means for determining a quality of said three stored gear ratio values, said quality measuring whether said three stored gear ratio values are sufficiently close with respect to one another so as to be likely to represent a valid gear ratio.

12. The electronic controller defined in claim 11 wherein said means for determining said quality of said three stored gear ratio values uses the following relationship:

$$[\min(X1, X2)] + [\max(X1, X2) - \min(X1, X2)] > \text{first threshold value}$$

wherein min(X1, X2) represents a smaller value of two of said stored gear ratio values, max (X1, X2) represents a larger value of said same two of said stored gear ratio values, and said first threshold value represents a predetermined measure of closeness for said two stored gear ratio values, said three stored gear ratios having three different permutations, said relationship being used for all of said three different permutations, and said quality indicates a valid gear ratio when all of said three different permutations satisfy said relationship.

13. The electronic controller defined in claim 12 wherein said first threshold value representing a predetermined measure of closeness is 50.

14. The electronic controller defined in claim 8 wherein said means for identifying a particular structure for the transmission is comprised of means for determining one or more second confidence values based on said calculated average gear ratio value in accordance with pre-programmed information for a plurality of particular transmission structures, each of said second confidence values being associated with a particular transmission structure, means for multiplying said calculated average gear ratio value with each of said determined second confidence values, means for storing and accumulating a plurality of said multiplied calculated average gear ratio/second confidence values in a storage means associated with each particular transmission structure, and means for determining when an accumulated value of one of said storage means associated with a particular transmission structure exceeds a predetermined second threshold value so as to identify a particular transmission structure.

15. The electronic controller defined in claim 14 wherein said means for multiplying said calculated average gear ratio value with each of said determined second confidence values further includes multiplying said multiplied calculated average gear ratio/second confidence values with said first confidence value, said multiplied value of said calculated average gear ratio with said first and second confidence values being stored in said storage means associated with each particular transmission structure.

16. The electronic controller defined in claim 14 wherein said second threshold value for said accumulated value of one of said storage means is 100%.

17. An automatically shifted vehicle transmission comprising:

a transmission having a plurality of meshing gears of varying size so as to provide a plurality of gear ratios;

an automatic shifting mechanism for selectively and automatically engaging at least two of said plurality of gear ratios, and an electronic controller for controlling said automatic shifting mechanism in accordance with a shifting strategy, said electronic controller comprising:

first means for determining an engaged gear ratio for the transmission;

second means responsive to the determined gear ratio for identifying a particular structure of the transmission; and third means responsive to the identified transmission structure for selecting a shifting strategy wherein the selected shifting strategy is used by the electronic controller for controlling said automatic shifting mechanism in accordance with the selected shifting strategy associated with the identified transmission structure so as to automatically shift the transmission.

18. A method for identifying a particular structure of an automatically-shifted transmission, the transmission including a plurality of gear ratios wherein at least two of the plurality of gear ratios are selectively and automatically engaged by an automatic shifting mechanism controlled by an electronic controller, the electronic controller thereby controlling the automatic shifting of the transmission in accordance with a shifting strategy, said method comprising the steps of:

(a) sensing a engaged gear ratio value of the transmission;

(b) identifying a particular structure for the transmission in response to the sensed gear ratio value; and (c) selecting a shifting strategy for the transmission in response to the identified transmission structure wherein the selected shifting strategy is used by the electronic controller for controlling said automatic shifting mechanism in accordance with the selected shifting strategy associated with the identified transmission structure so as to automatically shift the transmission.

19. The method defined in claim 18 wherein in step (b), the structure of the transmission is identified using fuzzy logic principles so as to distinguish a particular transmission structure from a plurality of transmission structures.

20. The method defined in claim 18 wherein in step (c), the selected shifting strategy is selected from said plurality of shifting strategies each associated with a different transmission structure.

* * * * *